(12) United States Patent  
Duzzny

(10) Patent No.: US 8,075,011 B1
(45) Date of Patent: Dec. 13, 2011

(54) ADJUSTABLE MOTORCYCLE WHEELIE DEVICE

(76) Inventor: Jeffrey Allen Duzzny, Youngstown, OH (US)

( * ) Notice: Subject to any disclaimer, the term of this patent is extended or adjusted under 35 U.S.C. 154(b) by 312 days.

(21) Appl. No.: 12/381,415

(22) Filed: Mar. 12, 2009

(51) Int. Cl.
*B62H 7/00* (2006.01)

(52) U.S. Cl. .................................. 280/293; 280/288.4

(58) Field of Classification Search ............... 280/205, 280/210, 19, 239, 288.4, 292, 293, 295, 296, 280/298, 302
See application file for complete search history.

(56) References Cited

U.S. PATENT DOCUMENTS

| | | | | |
|---|---|---|---|---|
| 1,369,116 A | * | 2/1921 | Krahn | 280/296 |
| 1,537,729 A | * | 5/1925 | Banks | 280/1.189 |
| 2,465,037 A | * | 3/1949 | Ream | 280/5.32 |
| 2,509,937 A | * | 5/1950 | Olson | 280/303 |
| 3,096,100 A | * | 7/1963 | Clarke et al. | 280/261 |
| 3,284,096 A | * | 11/1966 | Hansen et al. | 280/304.3 |
| 3,321,047 A | * | 5/1967 | Ryan et al. | 188/24.11 |
| 3,427,037 A | * | 2/1969 | Marasco | 280/1.189 |
| 3,653,679 A | * | 4/1972 | Howard | 280/32.7 |
| 3,888,511 A | * | 6/1975 | Parrilla | 280/239 |
| 3,961,810 A | * | 6/1976 | Arico | 280/239 |
| 3,997,185 A | * | 12/1976 | Parrilla | 280/304.3 |
| 4,012,054 A | * | 3/1977 | Moore | 280/239 |
| 4,153,268 A | | 5/1979 | Wilson et al. | |
| 4,154,452 A | * | 5/1979 | Newman | 280/293 |
| 4,353,571 A | | 10/1982 | Anderson | |
| 4,367,883 A | | 1/1983 | Anderson | |
| 4,522,420 A | * | 6/1985 | Hannappel | 280/755 |
| 4,573,696 A | * | 3/1986 | Buroff | 280/247 |
| 4,772,037 A | * | 9/1988 | Jones | 280/293 |
| 4,822,065 A | * | 4/1989 | Enders | 280/47.331 |
| 4,988,120 A | * | 1/1991 | Jones | 280/755 |
| 5,242,183 A | * | 9/1993 | Oberg et al. | 280/293 |
| 5,330,221 A | | 7/1994 | Sutton | |
| 5,368,323 A | | 11/1994 | Young | |
| D366,636 S | * | 1/1996 | Smith | D12/114 |
| D394,033 S | * | 5/1998 | Pingel et al. | D12/114 |
| 5,806,878 A | * | 9/1998 | Mroczka et al. | 280/653 |
| 5,813,258 A | * | 9/1998 | Cova et al. | 70/225 |
| 6,149,179 A | * | 11/2000 | Long | 280/293 |
| 6,423,914 B1 | | 7/2002 | Burnett | |
| 6,530,598 B1 | * | 3/2003 | Kirby | 280/755 |
| 6,715,779 B2 | * | 4/2004 | Eschenbach | 280/221 |
| 6,994,368 B2 | * | 2/2006 | Brown | 280/293 |
| 7,048,285 B1 | * | 5/2006 | Yates | 280/124.104 |
| 7,607,693 B2 | * | 10/2009 | Chavis | 280/767 |
| 7,762,569 B2 | * | 7/2010 | Fraser | 280/205 |
| 7,819,414 B2 | * | 10/2010 | Turner | 280/282 |
| 2002/0096849 A1 | * | 7/2002 | Bang | 280/87.041 |
| 2003/0001349 A1 | * | 1/2003 | Eschenbach | 280/62 |

(Continued)

FOREIGN PATENT DOCUMENTS

WO    WO 8908043 A1 *  9/1989

*Primary Examiner* — Paul N Dickson
*Assistant Examiner* — Brodie Follman
(74) *Attorney, Agent, or Firm* — Harpman & Harpman

(57) ABSTRACT

A teaching device for sport configured motorcycles that restricts the angular inclination of the motorcycle and therefore its effective height from the ground when performing a wheelie in which the motorcycle is positioned on its rear wheel as it is driven. A bracket assembly extends from the rear wheel of the motorcycle with pavement engagement wheels positioned on its free end. The bracket assembly can be adjusted to afford different engagement angles to safely stabilize and restrict the effective height of the sport motorcycle's front wheel off the pavement during the "wheelie" maneuver thus providing a teaching platform for individuals practicing the art of wheelies on sport configured motorcycles.

5 Claims, 3 Drawing Sheets

U.S. PATENT DOCUMENTS

| | | | |
|---|---|---|---|
| 2003/0024752 A1* | 2/2003 | Mayer et al. | 180/220 |
| 2005/0175968 A1* | 8/2005 | Milner | 434/61 |
| 2008/0007026 A1* | 1/2008 | Turner | 280/282 |
| 2008/0067765 A1* | 3/2008 | Chavis | 280/32.7 |
| 2009/0250899 A1* | 10/2009 | Nethery | 280/298 |
| 2010/0331149 A1* | 12/2010 | Turner | 482/57 |

* cited by examiner

ADJUSTABLE MOTORCYCLE WHEELIE DEVICE

BACKGROUND OF THE INVENTION

1. Technical Field

This invention relates to motorcycles and specifically sport type motorcycles that are characterized by different frame and body panel configurations that import a more streamline aerodynamic shaped and associated surfaces. Such sport motorcycles can be induced by their rider to be driven on the rear drive wheel by the rider's repositioning of their center of gravity and applying power to effectively elevate the front wheel.

2. Description of Prior Art

Prior art devices of this type have been directed to custom tail bars for specific vehicle application such as drag racing vehicles including motorcycles. Examples of prior art patents illustrate different wheelie devices can be seen in U.S. Pat. Nos. 4,153,268, 4,353,571, 4,367,883, 5,330,221, 5,368,323, 6,149,179 and 6,423,914.

In U.S. Pat. No. 4,153,268 a cycle stabilization accessory is claimed for bicycles that have a pair of telescopically adjustable armatures pivoted together, one of which has a small wheel on its free end.

U.S. Pat. No. 4,353,571 discloses a wheelie support for a typical motorcycle in which a back wheel fender extension is a fixed angular inclination for direct frictional pavement contact upon the execution of a wheelie.

U.S. Pat. No. 4,367,883 defines a wheelie support that is pivoted to a rear wheel axle and extends forward with an articulation wheel in selective engagement by an operator controlled structural member lifting up and under the rear wheel when engaged.

U.S. Pat. No. 5,330,221 shows a bicycle wheelie balancing device with a rearwardly extending support frame having a pivoted end wheel support portion which is in turn adjusted for degree of angular orientation by a secondary pivoted rod extending therefrom.

U.S. Pat. No. 5,368,323 is a bicycle safety bar device with multiple pairs of rear wheels on support rails extending from the bicycle.

U.S. Pat. No. 6,149,179 is directed to a wheelie stabilizer and safety device having a pivoted arm assembly extending from a spring urged mounting bracket on the rear axle of the bicycle.

Finally, in U.S. Pat. No. 6,423,914 illustrates a wheelie inhibitor device which has a switch housing secured to the vehicle with an electric switch that activates a rod extending therefrom preventing the wheelie action of the vehicle.

SUMMARY THE INVENTION

A wheelie training device for sport motorcycles that provides for an integrated wheel restraint support bracket to be pivotally adjusted and secured to the rear axle of the sport bike. An adjustable "wheelie" height armature and indexing plate selectively restricts the effective height of the wheelie by a frame engagement stop extending therefrom and pavement engaging secondary frame support wheels.

DETAILED DESCRIPTION OF THE INVENTION

Figure 1:
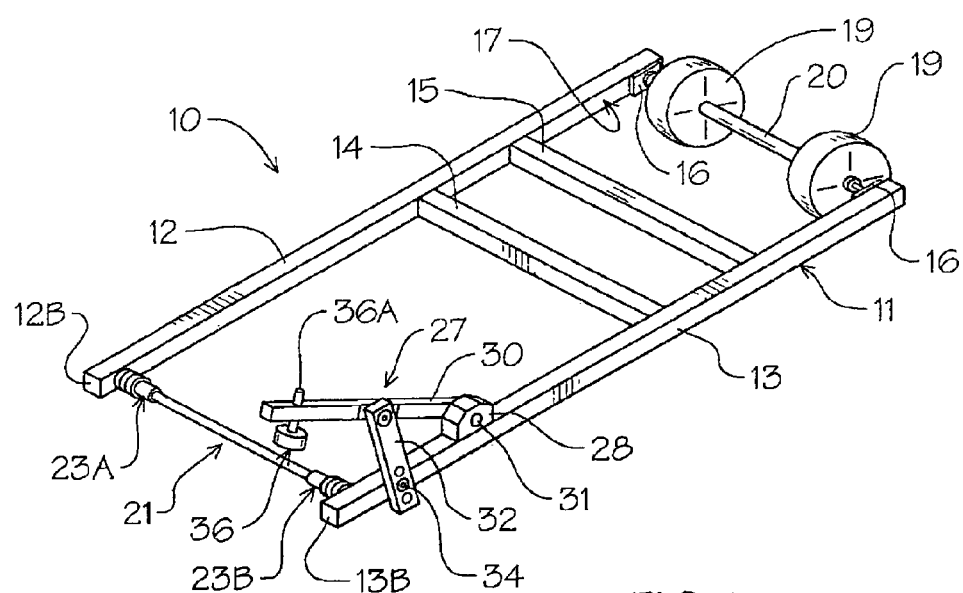
FIG. 1 is a perspective view of the adjustable wheelie support of the invention.
Figure 2:
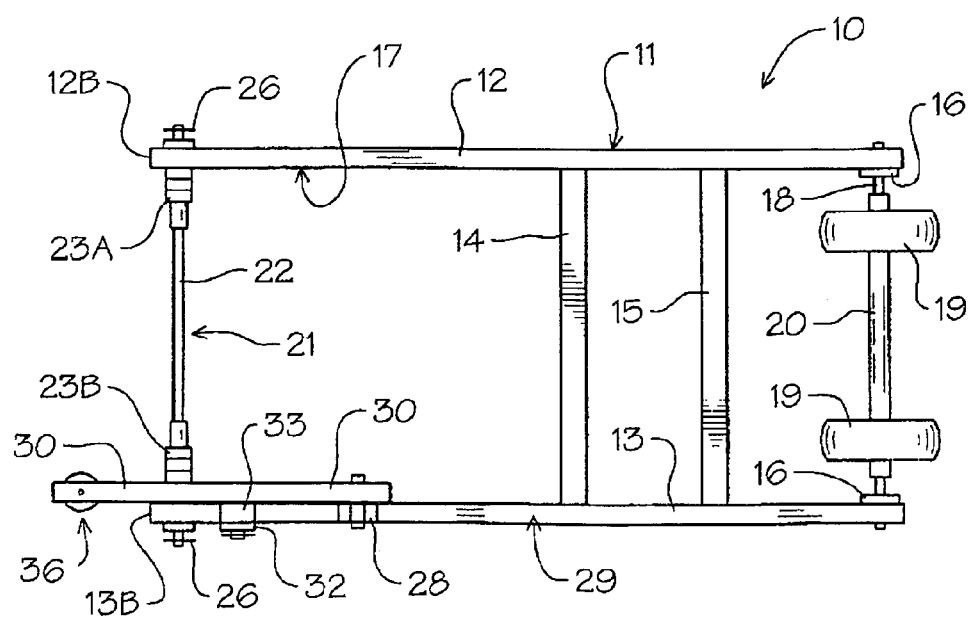
FIG. 2 is a top plan view thereof.

Referring to FIGS. 1 and 2 of the drawings, a wheelie support training device 10 can be seen having a main support frame 11 formed of parallel spaced side rails 12 and 13 with respective ends 12A, 12B and 13A, 13B. The rails 12 and 13 are interconnected by multiple transverse spaced tubular rods 14 and 15 inwardly from the respective rail ends 12A and 13A.

Reinforcement axle bearing plates 16 are welded to the effacing inside surfaces 17 of the rail ends 12A with a wheelie support axle rod 18 extending therethrough and therebetween. A pair of wheels 19 are rotatably mounted on the axle rod 18 by support bearings and spacer fittings 20 so as to be in longitudinally spaced relation to one another and the respective side rails as best seen in FIG. 2 of the drawings.

A front frame insert support rod assembly 21 extends between the rail's oppositely disposed free ends 12B and 13B. The rod assembly 21 has an axle rod 22 with end bearing inserts 23A and 23B so as to be positioned through the rear axle drive assembly 24 of a sport motor bike 25, see in FIGS. 2, 3 and 5 of the drawings. A pair of stainless steel pins 26 allow for quick mounting and removal of the wheelie support and training device 10 of the invention by insertion of the end bearing inserts 23A and 23B and axle rod 22 through the rear axle drive assembly 24 of the bike, as noted.

Figure 3:
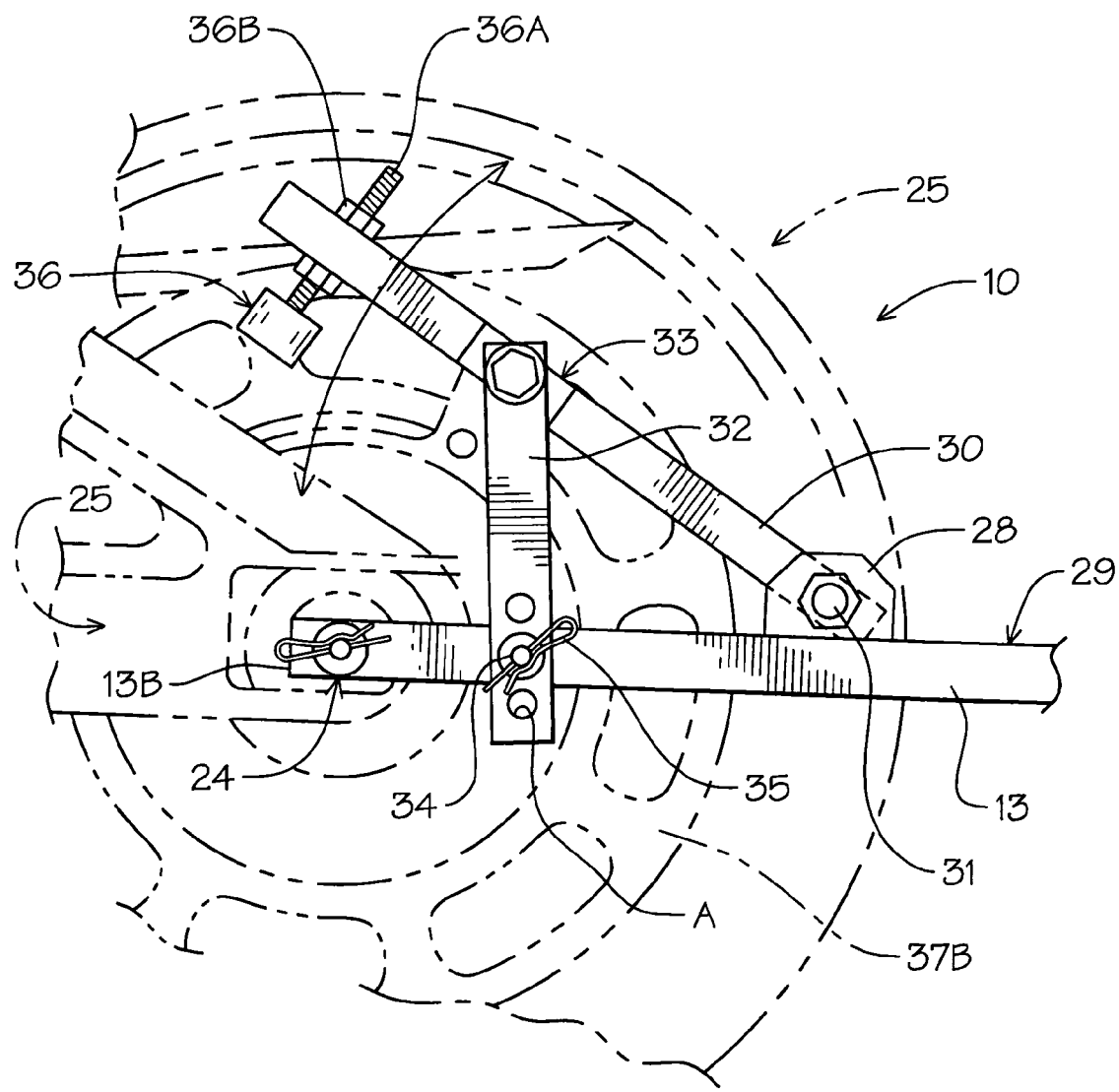
FIG. 3 is an enlarged partial side elevational view of the wheelie support device of the invention on a motorcycle.
Figure 4:
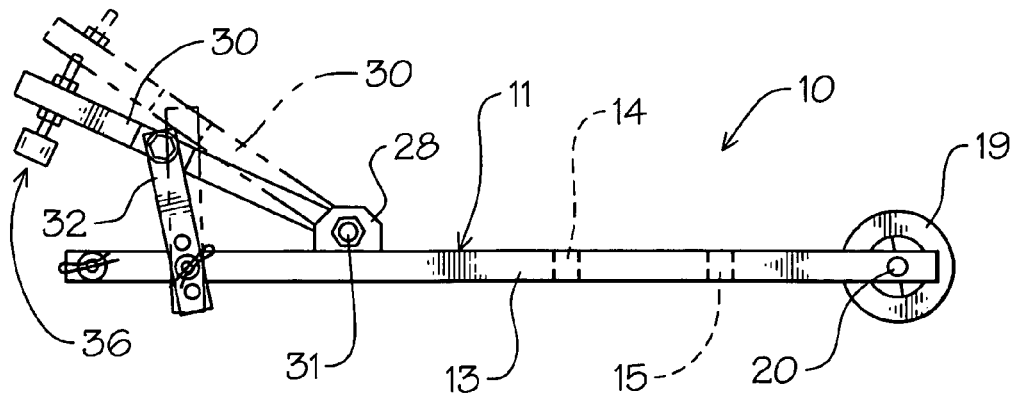
FIG. 4 is a side elevational view of the wheelie support.

A wheelie height alignment adjustment assembly 27 is mounted to the side rail 13 having an apertured mounting lug 28 welded to an upper surface 29 of the rail in spaced relation to its axial mounting end 13B as seen in FIGS. 1, 2 and 3 of the drawings. A tubular bike engagement arm 30 is pivotally secured to the lug 28 by a bearing bolt and lock nut assembly 31 so as to be pivotally positioned therewithin.

An apertured A adjustment linkage bar 32 is pivotally secured between the engagement arm 30 and the side rail 13 from a spacer block and bearing and bolt nut fitting 33 on the arm 30 to an apertured pivot pin 34 through the side rail 13 respectively.

A resilient retainment pin 35 extends through the pivot pin 34 and selectively retains the apertured end of the linkage bar 32 positioned on the pin fitting 34 as seen in FIG. 3 of the drawings.

Multiple longitudinally aligned apertures A in the linkage 32 define different pivot pin engagement positions and thus the angular orientation of the arm 30 to the rail 13. An engagement rod arm stop 36 is adjustably positioned on a threaded rod 36A extending through the free end of the engagement arm 30 with locking nuts 36B position thereon as best seen in FIG. 3 of the drawings.

Figure 5:
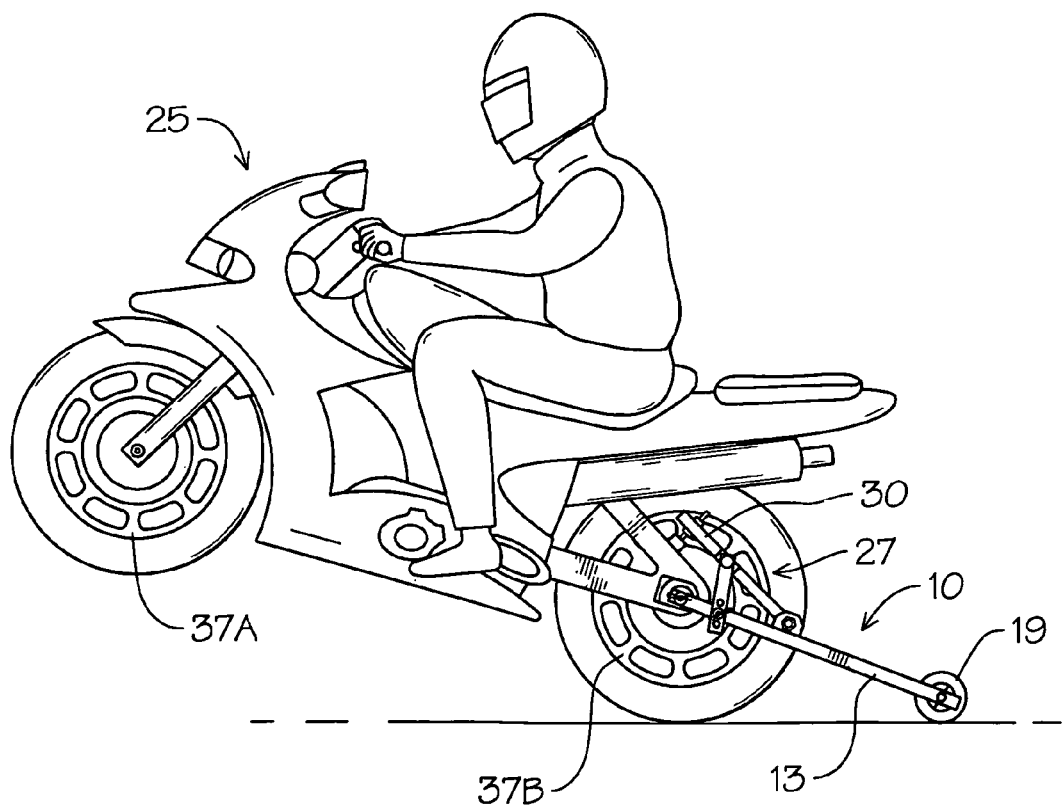
FIG. 5 is a side perspective view of the wheelie support device on a motorcycle in use performing a wheelie.

Referring now to FIG. 5 of the drawings, the sport bike 25 is illustrated in a so-called "wheelie" position in which a front wheel 37A is raised off the ground by applying excess power to a rear drive wheel 37B and shifting the center of gravity on the bike by the rider R. The wheelie support and training device 10 of the invention is shown attached to the sport bike 25 and with its wheels 19 engaged on the pavement P restricting the effective height of the sport bike 25 wheelie which has been pre-determined by the setting of the adjustable linkage bar 32 and the arm stop 35 as hereinbefore described.

It will thus be seen that a new and novel wheelie training and support device of the invention has been illustrated and described and it will be apparent to those skilled in the art that various changes and modification may be made thereto without departing from the spirit of the invention.

Therefore I claim:

1. A sport motor bike wheelie training and support device comprises,
   a rectangular support frame adapted to be secured to a rear drive wheel axle of the sport motor bike, said rectangular support frame having spaced parallel side rails and interconnecting transverse rods therebetween,
   an axle insertion rod assembly on said support frame extending through a rear drive wheel assembly of said sport motor bike,
   a bike engagement arm pivotally secured to said support frame,
   an adjustment linkage extending between said bike engagement arm and said support frame, said adjustment linkage pivotally secured to said engagement arms inwardly of engagement arms free end secured by apertures to one of said side rails,
   an arm stop adjustably extending from a free end of said bike engagement arm, said arm stop on a thread rod extending from said engagement arm,
   stabilization wheels on said support frame in oppositely disposed relation to said axle insertion rod assembly.

2. The sport motor bike wheelie training and support device set forth in claim 1 wherein said support frame is preferably made of tubular metal.

3. The sport motor bike wheelie training and support device set forth in claim 1 wherein said axial insertion rod assembly is selectively secured through said rear drive wheel assembly by resilient lock pins extending therethrough.

4. The sport motor bike wheelie training and support device set forth in claim 1 wherein said stabilization wheels are rotatably mounted on an axle rod fitting extending between parallel frame side rails.

5. The sport motor bike wheelie training and support device set forth in claim 4 wherein said stabilization wheels on said axle rod fitting extend between said frame side rails are in longitudinally spaced relation to one another and said frame rails.

* * * * *